US006422958B1

(12) United States Patent
Repetto et al.

(10) Patent No.: US 6,422,958 B1
(45) Date of Patent: Jul. 23, 2002

(54) FRAME FOR A GAME RACQUET FORMED BY FILAMENT WINDING

(76) Inventors: David W. Repetto, 3908 W. Berteau, Chicago, IL (US) 60618; Charles Tricou, 2484 Buchenhurst Rd., State College, PA (US) 16801; David Price, 131 East Harbor, Hendersonville, TN (US) 37075

( * ) Notice: Subject to any disclaimer, the term of this patent is extended or adjusted under 35 U.S.C. 154(b) by 792 days.

(21) Appl. No.: 08/661,593

(22) Filed: Jun. 11, 1996

Related U.S. Application Data (63) Continuation-in-part of application No. 08/201,198, filed on Feb. 24, 1994, now Pat. No. 5,540,877, and a continuation-in-part of application No. 08/201,280, filed on Feb. 24, 1994, now Pat. No. 5,575,881.

(51) Int. Cl.$^7$ .............................................. A63B 49/10
(52) U.S. Cl. ...................................................... 473/536
(58) Field of Search ................................ 473/535, 536; 7/7

(56) References Cited

U.S. PATENT DOCUMENTS

| | | | |
|---|---|---|---|
| 3,998,458 A | | 12/1976 | Inoue |
| 4,061,520 A | * | 12/1977 | Cecka et al. ................ 473/535 |
| 4,061,806 A | | 12/1977 | Lindler |
| 4,070,020 A | | 1/1978 | Dano |
| 4,089,727 A | | 5/1978 | McLain |
| 4,114,880 A | * | 9/1978 | Cecka ........................ 473/536 |
| 4,123,054 A | | 10/1978 | Septier |
| 4,128,963 A | | 12/1978 | Dano |
| 4,135,035 A | | 1/1979 | Branan |
| 4,157,181 A | | 6/1979 | Cecka |
| 4,172,175 A | | 10/1979 | Pearson |
| 4,212,461 A | * | 7/1980 | Cecka et al. ................ 473/535 |
| 4,399,992 A | * | 8/1983 | Molitor ...................... 473/536 |
| 4,725,059 A | * | 2/1988 | Du Gardin et al. ......... 473/536 |
| 4,848,745 A | | 7/1989 | Bohannan |
| 4,892,764 A | | 1/1990 | Drain |
| 4,911,444 A | | 3/1990 | Yoneyama |
| 4,983,242 A | | 1/1991 | Reed |
| 5,029,858 A | * | 7/1991 | Chen ......................... 473/535 |
| 5,143,669 A | * | 9/1992 | Mott ......................... 473/535 |
| 5,176,868 A | | 1/1993 | Davis |
| 5,217,223 A | * | 6/1993 | Feeney ...................... 473/535 |

FOREIGN PATENT DOCUMENTS

| | | |
|---|---|---|
| DE | 1596658 | 1/1967 |
| DE | 2736125 | 3/1978 |
| DE | 5426861 | 2/1979 |
| DE | 3039140 | 5/1982 |
| EP | 170178 | 5/1986 |
| EP | 470895 A2 | 8/1991 |
| FR | 2030036 | 8/1969 |
| FR | 2568171 | 7/1984 |
| FR | 2581319 | 5/1985 |
| FR | 2665665 | 8/1990 |
| FR | 2670152 | 12/1990 |
| FR | 2670154 | 12/1990 |
| FR | 2671756 | 1/1991 |
| FR | 2673570 | 3/1991 |
| JP | 52123731 | 10/1977 |
| JP | 61220828 | 10/1986 |
| TW | 81107875 | 10/1992 |

OTHER PUBLICATIONS

Processing and Fabrication Technology, pp. 193–204 (1990).
Filametn Winding, pp. 2–7 (1966).
Filament Winding Composite Structure Fabrication, pp. 3–4 through 3–7 (1991).
"Composites in Racquetball and Tennis Rackets" presented at the Composites Manufacturing and Tooling '94 meeting, Jan. 17–20, 1994.
Filament Windings: Its Development, Manufacture, Applications, and Design, pp. 102–111 (1964).

* cited by examiner

Primary Examiner—Mark S. Graham
(74) Attorney, Agent, or Firm—John W. Chestnut (57) ABSTRACT

A frame for a game racquet such as a tennis racquet is formed by winding a filament over a mandrel to form a tube, wetting the filament with resin before or after winding, forming the wound tube into a preform, inserting the preform into a mold, and molding and curing the preform to form a rigid racquet frame.

1 Claim, 10 Drawing Sheets

Fig. 3

$+\alpha_1$ $+\alpha_2$ $+\alpha_3$ $+\alpha_4$ $+\alpha_5$ $+\alpha_6$ $-\alpha_5$ $-\alpha_4$ $-\alpha_3$ $-\alpha_2$ $-\alpha_1$
$-\alpha_6$

FRAME FOR A GAME RACQUET FORMED BY FILAMENT WINDING

RELATED APPLICATIONS

This application is a continuation-in-part of an application entitled "Continuous Fiber Reinforced Resin Transfer Molded Frame for a Game Racquet," Ser. No. 08/201,198, filed Feb. 24, 1994, U.S. Pat. No. 5,540,877 and an application entitled "Filament Wound Frame for A Game Racquet," Ser. No. 08/201,280, filed Feb. 24, 1994 U.S. Pat. No. 5,575,881.

BACKGROUND

This invention relates to a frame for a game racquet, and, more particularly, to a frame which is formed by filament winding.

The invention will be explained with reference to frames for tennis racquets. It will be understood, however, that the invention can be used to form frames for other game racquets, such as racquetball racquets, squash racquets, badminton racquets, etc.

Current racquet production methods take composite fiber and resin prepreg materials and roll, wrap, or fold the material by hand around an inflatable bladder and into a racquet preform shape, sometimes called a hairpin. A yoke which is formed by wrapping composite fiber and resin material around foamable resin material is attached to the hairpin to form the bottom of the hoop-shaped head portion of the frame. The yoke is attached to the hairpin by wrapping composite fiber and resin prepreg tape around the ends of the yoke and the hairpin. The preform is inserted into a mold having a cavity in the shape of the racquet frame, the bladder is inflated to force the hairpin against the surface of the mold cavity, and the mold is heated to cure the resin. The heat causes the foamable resin in the yoke to foam and expand, thereby forcing the yoke against the surface of the yoke portion of the mold cavity.

Some racquet frames have been formed by filament winding method in which a tow of resin wetted fiber or resin impregnated fiber (towpreg) is wound over a mandrel to form the preform. The preform is then inserted into a female tool and molded under heat while pressure is applied through an internal bladder inflated with compressed air.

Filament winding is a well known process for forming products from filament material such as graphite fiber, glass fiber, etc. In the filament winding process, filament material is wound around a rotating mandrel to form a tube. The filament material can be in the form of a tow, which is formed from a plurality of filaments or continuous fibers, for example, with 3000, 6000, or 12,000 carbon filaments per tow. Fewer or more filaments per tow can be used for carbon as well as other fibers, for example, from one to 50,000.

The filament material is coated with resin before or after winding. The wound tube is placed in a mold having the shape of the end product, and the mold is heated to cure the resin.

Filament wound parts are normally manufactured by winding discrete layers of material on a mandrel, using a helical or geodesic path. Each layer is made up of a 2-ply balanced laminate formed from a multicircuit winding pattern. The number of circuits required for each layer is calculated from the bandwidth of the material and the wind angle, so that the pattern closes and a constant thickness is achieved in the layer. Different layers may be wound at different angles, but each layer typically consists of a $+\alpha°$ angle ply and a $-\alpha°$ angle ply with respect to the longitudinal axis of the rotating mandrel, resulting from the reciprocating traverse of the carriage in the winding machine.

Tennis racquets have been produced by conventional filament winding. For example, EPO patent publication No. 0 470 896 describes forming a frame for a tennis racquet by winding fibers of glass, carbon, or other materials.

Preforms for racquet frames are generally made from fibers which have been wetted with resin. Sheets or ribbons of fiber and resin are referred to as prepreg. Tows of fiber and resin are referred to as towpreg.

The following definitions are used herein:

CIRCUIT: One complete traverse of the fiber feed mechanism of a filament winding machine.
TOW: Untwisted bundle of continuous filaments.
PLY: A single pass on a filament winding machine in which fiber is applied in one direction to the axis of the mandrel. A LAYER is typically formed from a series of winding circuits resulting in a closed pattern of 2-plies; one of $+\alpha°$ and the other of $-\alpha°$.
LAMINA: A single ply or layer in a laminate made up of a series of layers.

SUMMARY OF THE INVENTION

The invention forms a racquet frame from composite material by using filament winding process to make a filament wound preform. The fibers are wetted by a resin before or after winding. A yoke which is made from fiber and resin prepreg wrapped around foamable resin is attached to the preform by wrapping fiber and resin prepreg tape around the ends of the yoke and the preform. Additional areas of the preform can be reinforced with fiber and resin prepreg tape as desired. The preform is cured in a mold under heat and pressure.

DESCRIPTION OF THE DRAWINGS

The drawings will be explained in conjunction with the illustrative embodiments shown in the accompanying drawings, in which.

DESCRIPTION OF SPECIFIC EMBODIMENT

Figure 1:
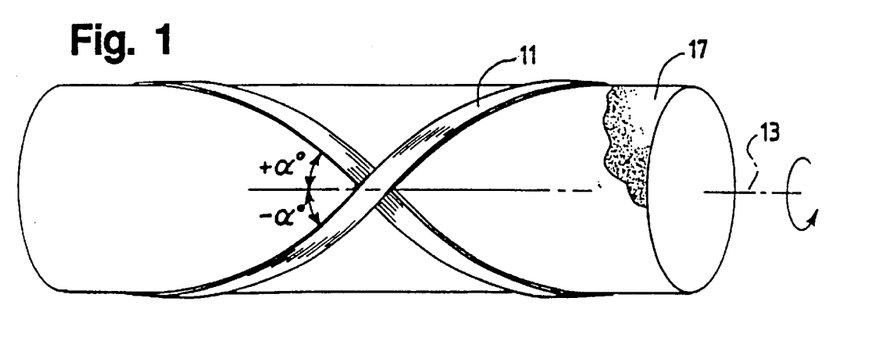
FIG. 1 is a schematic illustration of a helical-wound filament around a mandrel.

FIG. 1 illustrates a helical-wound filament in which tows 11 are wound over a rotating mandrel 12 covered by an inflatable tubular plastic bladder 17. Filament winding machines are well known and need not be described herein. Such winding machines conventionally include a rotary driven, elongated mandrel and a filament-feeding carriage which is mounted for longitudinal movement back and forth along the length of the mandrel. The carriage moves along the mandrel in one direction to lay down a filament tow in a constant angle helical path, or geodesic path, and then moves in an opposite direction to lay down the filament at an angle negative to the previous pass. In conventional winding, after the first circuit is completed, the applied filaments are not adjacent and additional circuits must be traversed before the pattern begins to lay filaments adjacent to each other. This helical path is continued for the number of circuits required to close the pattern in both directions of filament traverse. Once this initial pattern becomes closed and the initial layer is completed, then additional layers are wound in a similar manner as selected by the designer.

Figure 2:
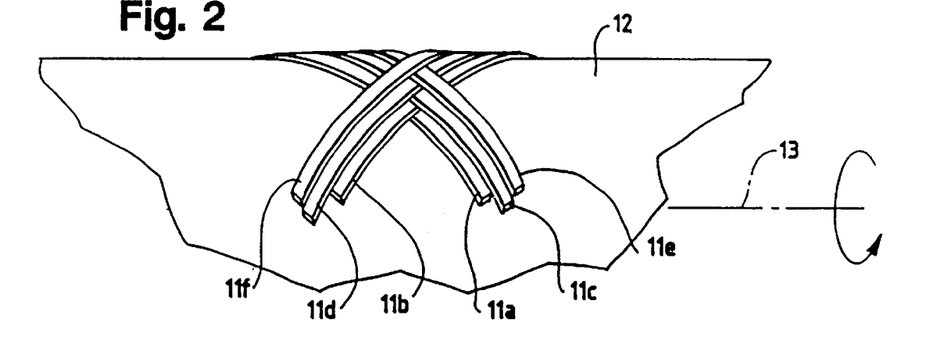
FIG. 2 is a schematic illustration of additional circuits of filament winding.

In FIG. 2 the first circuit of filament material is indicated by the tow 11a which extends at an angle, typically between + near 0° to +45°, to the longitudinal axis 13 of the mandrel. The second circuit of filament material is wound in the opposite direction and is indicated by tow 11b which extends at an angle of minus near 0° to −45° to the axis of the mandrel. Succeeding circuits of filament material are indicated by the tows 11c, 11d, 11e, 11f, etc., are wound in a similar manner until the pattern is closed. These windings form the first and second plies, or the initial layer around the mandrel. Once the pattern is closed with these first and second plies, this initial layer is followed by succeeding layers in a similar manner, until the laminate, consisting of various layers of wound filaments is complete.

Figure 3:
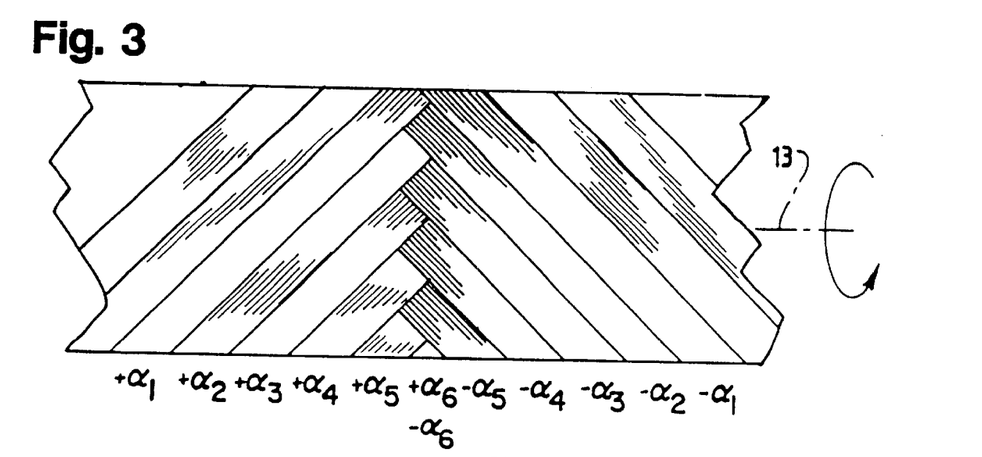
FIG. 3 is a schematic illustration of a helical wind pattern showing the first of three layers of filaments, the first layer (2-plies) consisting of $+\alpha°$ and $-\alpha°$ angle windings.
Figure 3A:
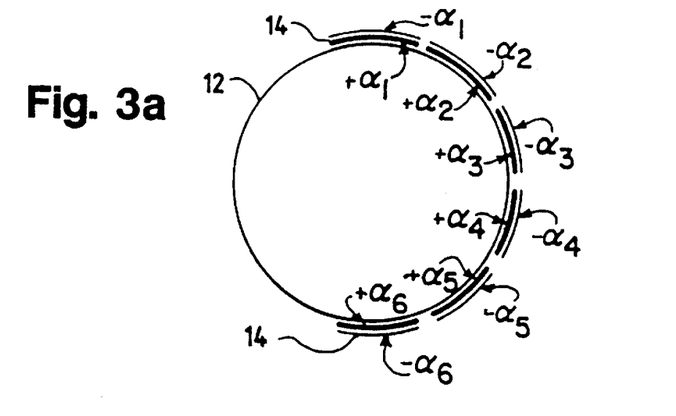
FIG. 3a is a cross-sectional view of the first layer of half the mandrel.

FIGS. 3 and 3a illustrate the initial layer of a conventional helical winding pattern in which both the positive angle ply and the negative angle ply in relation to the centerline 13 of the winding mandrel are closed. In this example, we assume that the winding angle $\alpha$ is 45° and the diameter of the mandrel is such that a total of 9 circuits have been calculated to close the pattern. A one-half cross-sectional view of the mandrel 12 is given showing the two ±45° angle plies of filaments. The length of the arch 14 formed by both the +α° and −α° wind angles is based on the bandwidth and wind angle of the filament.

Figure 3B:
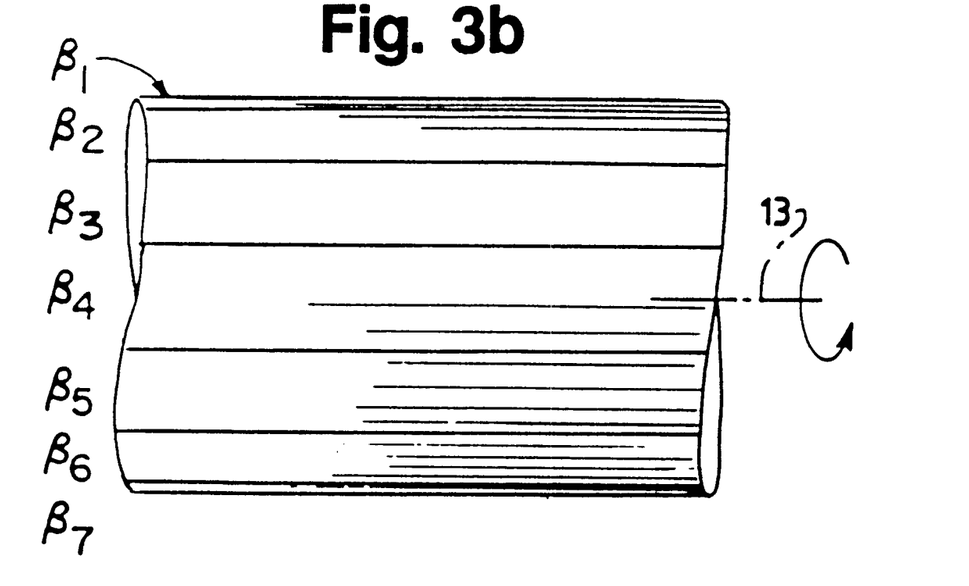
FIG. 3b is a schematic illustration of the middle layer of 0° wind angle filaments.
Figure 3C:
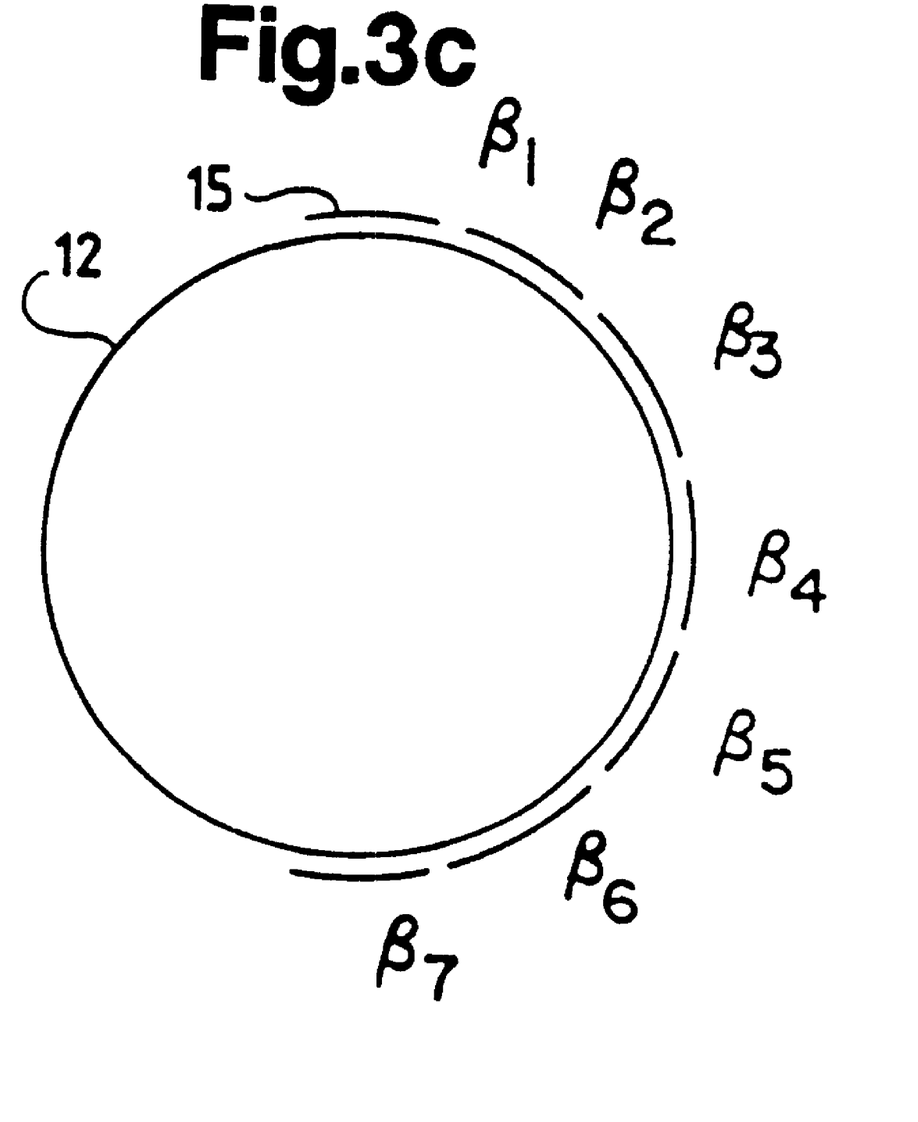
FIG. 3c is a cross-sectional view of the middle layer.

FIGS. 3b and 3c illustrate the middle layer of a conventional winding pattern where the wind angle $\beta$ is 0°, or parallel, to centerline 13 of the mandrel 12. A one-half cross-sectional view of the mandrel 12 is given showing in this example a total of 12 circuits needed to close this 0° wind pattern. The length of the arc 15 will be equal to the width of the filament.

Figure 3D:
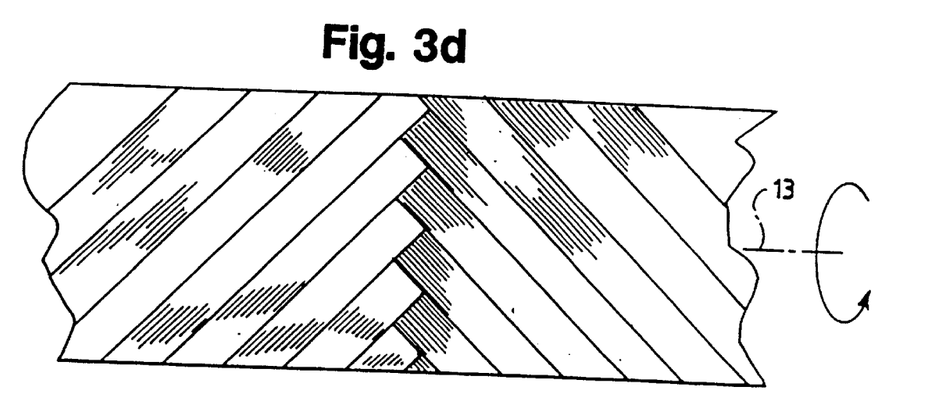
FIG. 3d is a schematic illustration of a helical wind pattern showing the third layers of filaments.
Figure 3E:
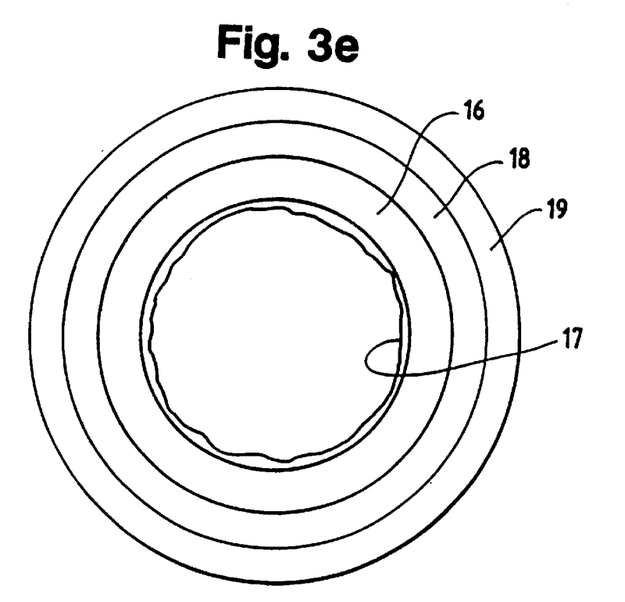
FIG. 3e is a cross-sectional view of all three closed pattern layers.

FIGS. 3d and 3e illustrate the third layer of this laminate structure where the wind angle $\gamma$ to the centerline 13 of the mandrel is applied to the mandrel in both positive and negative angle plies, as in FIG. 3. In this example, we have selected $\gamma$ to be equal to 45°, and thus needs 9 circuits to close the pattern. In FIG. 3e, a cross-sectional view of the completed laminate is illustrated consisting of the inflatable bladder 17, the 1st layer of wound filament 16 wound at angle ±α°; the 2nd layer of wound filament 18 wound at angle ±β°; and the 3rd layer of wound filament 19 wound at angle ±γ°.

The filaments can be wetted or impregnated with resin before winding or the wound filaments can be wetted with resin after winding.

The filament tube is then shaped into a racquet preform and inserted into a mold and heated while the bladder is pressurized to cure the resin and form a rigid, fiber reinforced frame. It is common in racquet fabrication to insert reinforcement plies of both 0° and/or 90° fiber cut pieces between the layers of filaments at various locations in the hoop and handle areas of the frame.

Figure 4:
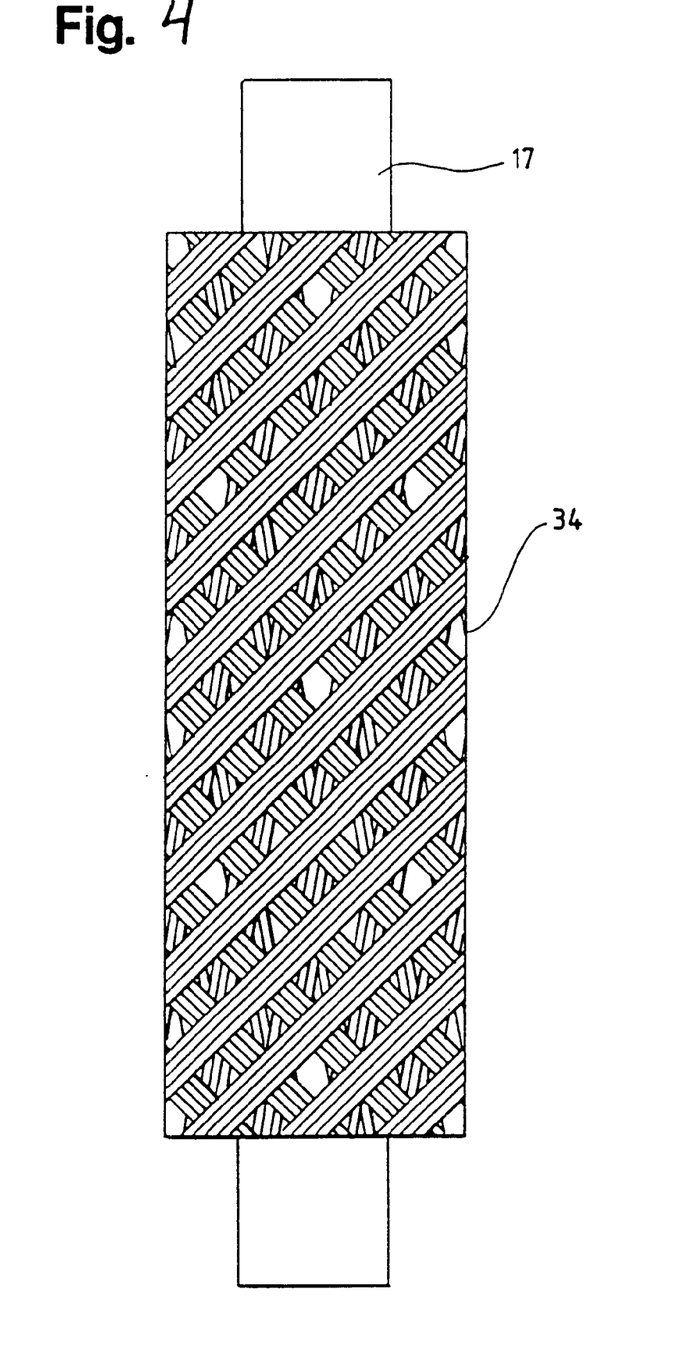
FIG. 4 illustrates the wound tube and an inflatable bladder during the placement of the initial circuits of material.

FIG. 4 illustrates a filament wound tube 34 after it has been removed from the mandrel. The tows which are used to form the wound tube are preferably formed from graphite fibers. However, the fibers can also be used either alone or in combination, such as glass, aramid, boron, etc. An inflatable bladder 17 is positioned inside the tube. The bladder can be inserted into the tube after the tube is wound and removed from the mandrel, or the bladder can be inserted over the mandrel so that the tube is wound over the bladder. FIG. 1 illustrates inserting the bladder on the mandrel before winding. The bladder is conventional and can be formed from plastic or elastomer material.

Figure 5:
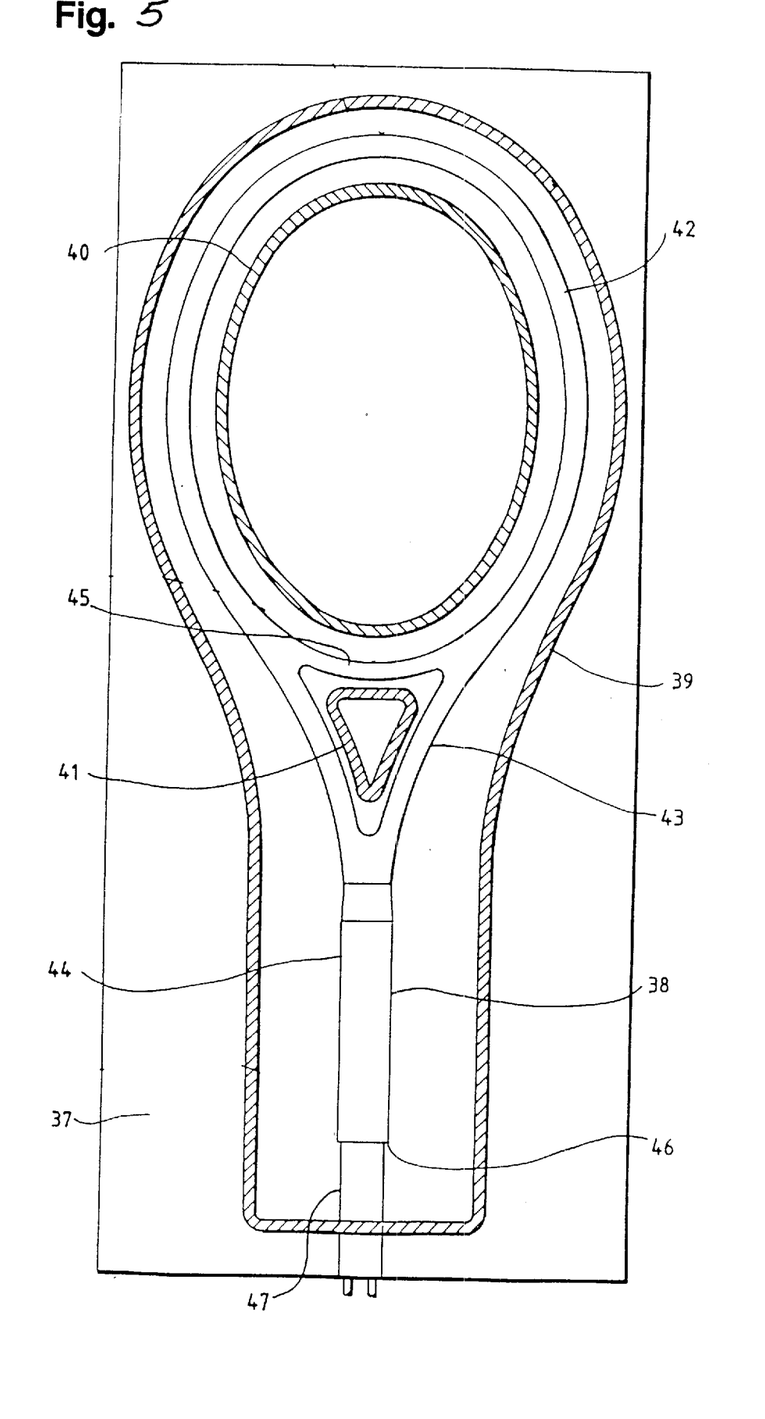
FIG. 5 is a plan view of a mold for a tennis racquet frame.

FIG. 5 illustrates one-half of a mold 37. The mold includes a cavity 38, an outer elastomer seal 39 which surrounds the cavity, and inner elastomer seals 40 and 41. The mold cavity has the shape of a racquet frame and includes a hoop-shaped head portion 42, a Y-shaped or triangular throat portion 43, and a handle portion 44. A yoke portion 45 extends across the throat portion and forms the bottom of the head portion. The bottom or butt end of the handle is formed by the cavity surface 46. A bladder manifold 47 extends from the butt end to the outside of the mold for encasing and protecting the bladder.

Figures 6, 7:
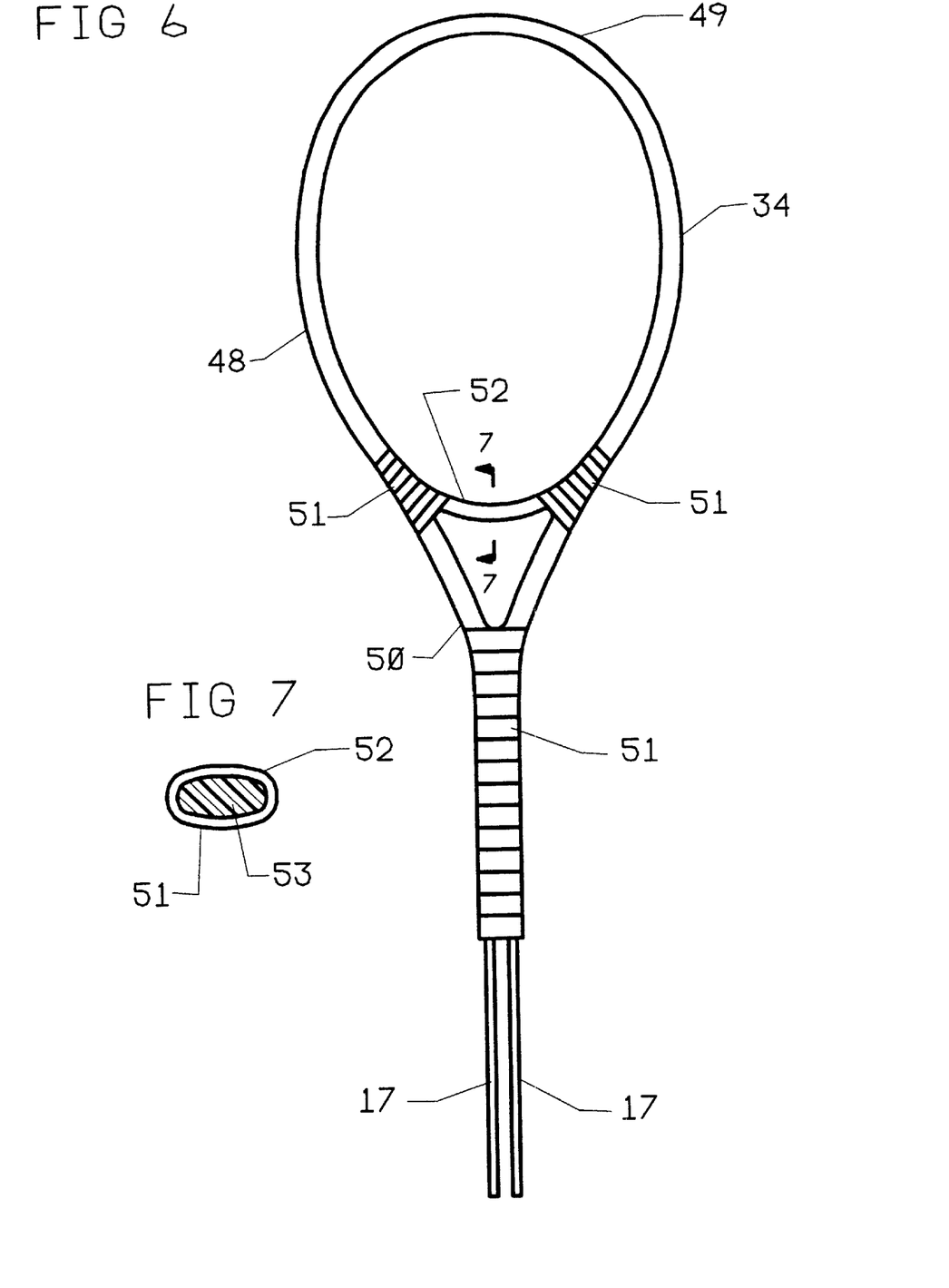
FIG. 6 is a front elevational view of a preform for a tennis racquet frame.
FIG. 7 is a sectional view taken along the line 7—7 of FIG. 7.

Referring to FIG. 6, the tube 34 is formed into a preform 48 having the shape of a hairpin. The middle portion 49 of the tube forms the head or hoop portion of the hairpin, and the ends of the tube form the handle portion 50 of the preform. The handle portion 50 is secured and reinforced by wrapping with conventional prepreg tape 51 which is formed from continuous graphite fibers wetted or impregnated with resin. The fiber direction of the tape can be anywhere from 0° to 90° to the longitudinal direction of the tape. The width of the tape can be varied as desired.

A yoke 52 is attached to the hairpin to form the bottom of the hoop. The yoke is formed from prepreg tape 51 which is wrapped around conventional foamable resin material 53 (FIG. 7). The ends of the yoke are secured to the hairpin and reinforced by wrapping prepreg tape 51 around the ends of the yoke and the hairpin. The width of the tape can be varied as desired. The tape extends from about the 4:30 to 5:30 position and from about the 6:30 to 7:30 position on the hoop. The tape covers the end portions of the yoke, the junction of the yoke and the hairpin, and extends upwardly along the hairpin beyond the ends of the yoke.

Additional reinforcement can be provided to any other areas of the preform which might be structurally deficient and for which structural reinforcement is desired by wrapping the preform with prepreg tape 51.

The preform is inserted into the mold 37, the mold is closed, and the bladder 17 is pressurized to force the preform against the surface of the mold cavity. The mold is heated to cure the resin, and the heat causes the foamable resin 53 to foam and expand, thereby forcing the yoke against surface of the yoke portion of the mold cavity.

Figure 8:
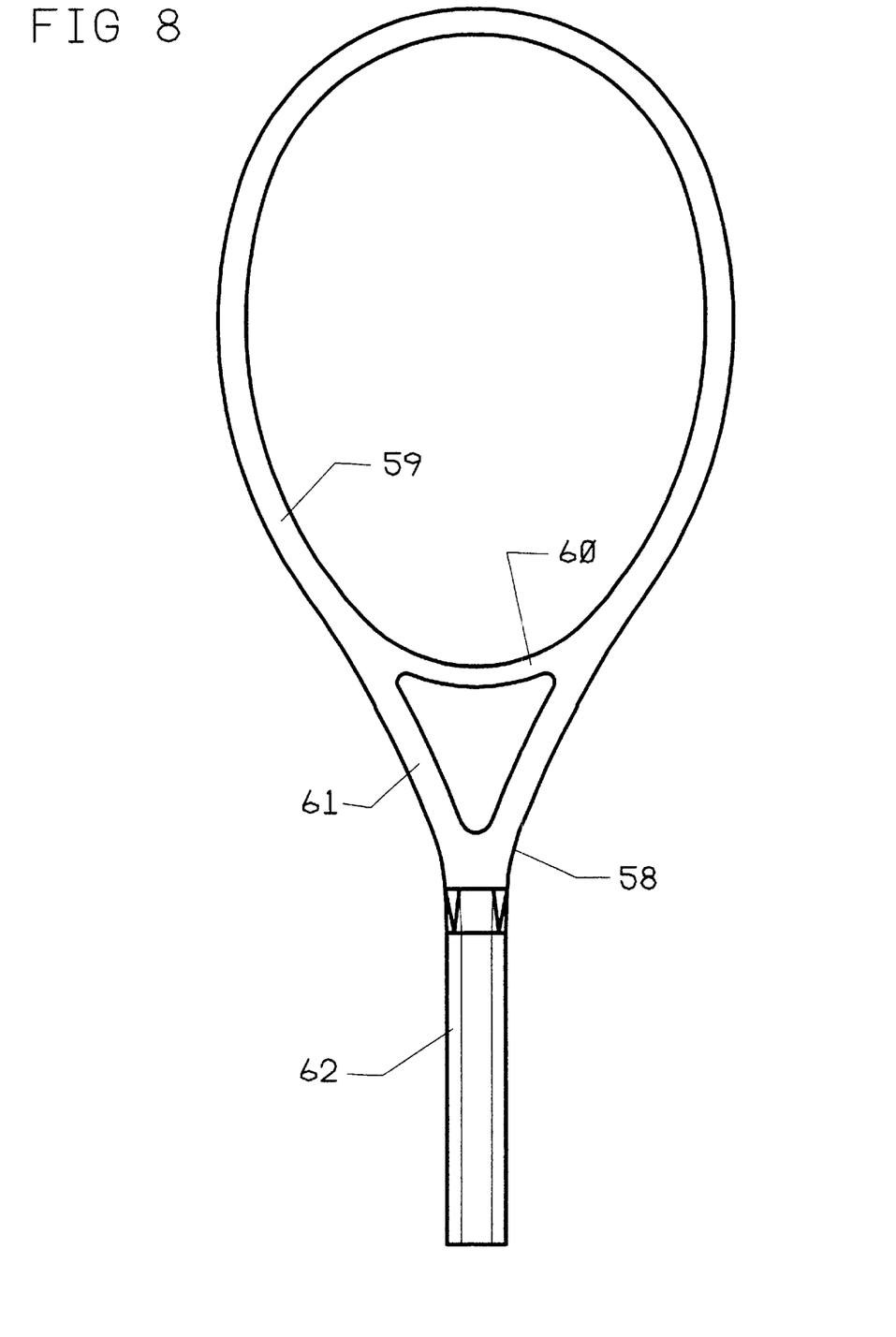
FIG. 8 is a front elevational view of a molded tennis racquet frame.

FIG. 8 illustrates a molded tennis racquet frame 58 after it is removed from the mold. The frame is shaped like the mold cavity and includes a head 59, a yoke 60, a Y-shaped or triangular throat 61, and a handle 62. The frame may have a conventional length of 27 inches when measured along the longitudinal axis of the frame or may be shorter or longer.

Figure 9:
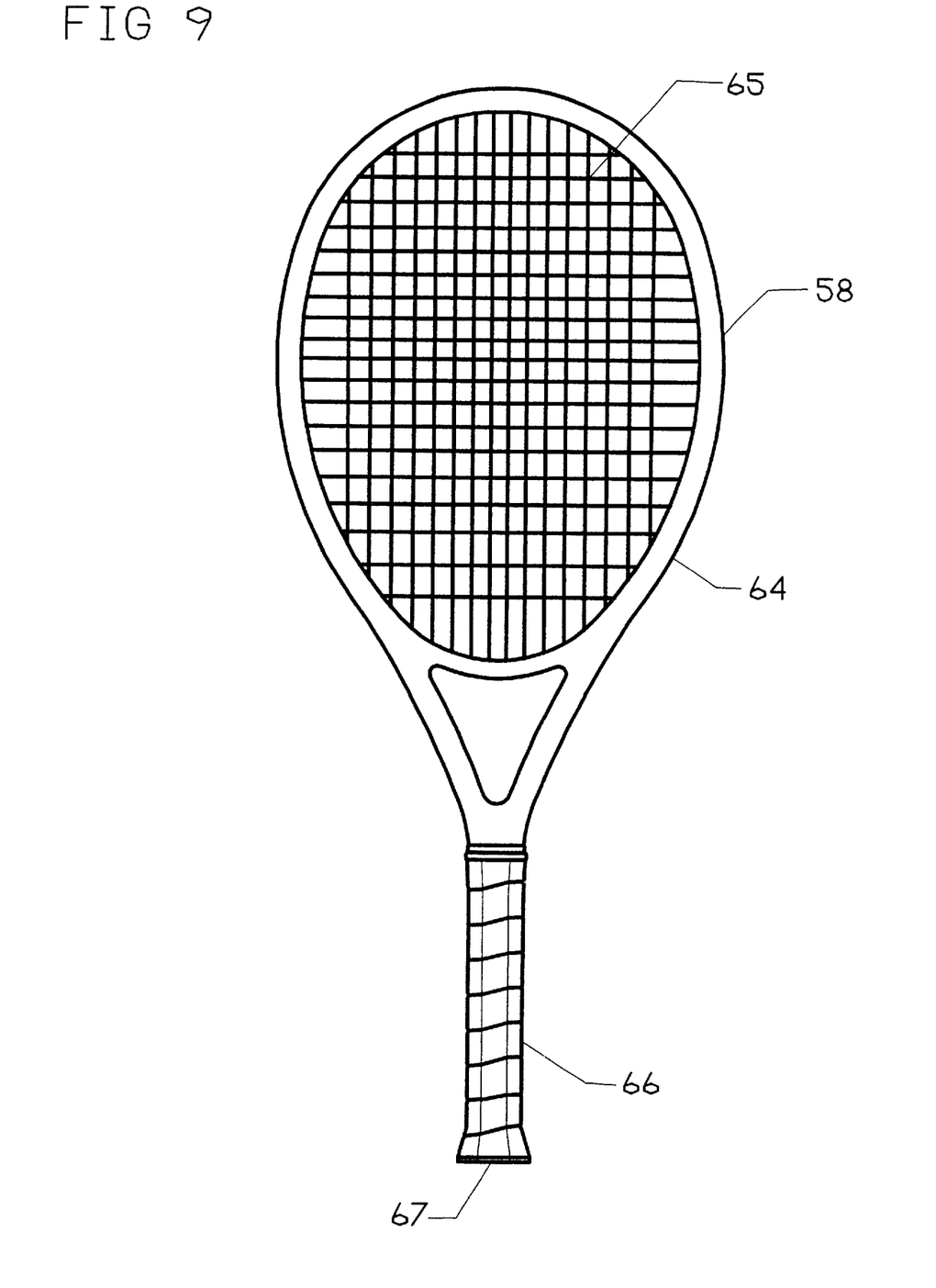
FIG. 9 is a front elevational view of a completed tennis racquet.

FIG. 9 illustrates a completed tennis racquet 64 which includes the frame 58, strings 65, and a grip 65 which is spirally wrapped around the handle. A butt cap 67 is inserted on the bottom of the handle before the grip is wrapped.

While in the foregoing specification, a detailed description of a specific embodiment of the invention was set forth for the purpose of illustration, it will be understood that many of the details herein given may be varied considerably by those skilled in the art without departing from the spirit and scope of the invention.

We claim:

1. An improve game racquet of a composite material comprising a frame, a triangular throat portion and a plurality of reinforcing pieces; wherein said frame is made of a tubular member of a predetermined length by a filament winding method, with said tubular member having the shape of a game racquet frame by bending, said tubular member comprising a plurality of helically-wound filaments and resin; wherein said triangular throat portion is made of a foam material wrapped with resin prepreg tape; wherein said reinforcing pieces have a predetermined size and a predetermined angle and are made of resin prepreg tape, said reinforcing pieces being used to reinforce a plurality of structurally deficient areas of said frame and said triangular throat portion; and wherein said frame reinforced by said reinforcing pieces and said triangular throat portion reinforced by said reinforcing pieces are arranged in a molding tool in which an improved game racquet frame of a composite material is formed under heat and pressure.

* * * * *